United States Patent
Takeda

(10) Patent No.: US 9,372,654 B2
(45) Date of Patent: Jun. 21, 2016

(54) IMAGE PROCESSING SYSTEM, INFORMATION PROCESSING APPARATUS, IMAGE PROCESSING APPARATUS, METHOD OF CONTROLLING INFORMATION PROCESSING APPARATUS, METHOD OF CONTROLLING IMAGE PROCESSING APPARATUS AND STORAGE MEDIUM

(75) Inventor: Kyohei Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1157 days.

(21) Appl. No.: 12/620,846

(22) Filed: Nov. 18, 2009

(65) Prior Publication Data

US 2010/0123933 A1    May 20, 2010

(30) Foreign Application Priority Data

Nov. 18, 2008   (JP) ................. 2008-294426

(51) Int. Cl.
  *G06F 3/12*   (2006.01)
  *H04N 1/00*   (2006.01)

(52) U.S. Cl.
  CPC ............ *G06F 3/1297* (2013.01); *G06F 3/1208* (2013.01); *G06F 3/1275* (2013.01); *H04N 1/00347* (2013.01); *H04N 1/00949* (2013.01); *H04N 1/00973* (2013.01); *H04N 2201/001* (2013.01); *H04N 2201/0013* (2013.01); *H04N 2201/0015* (2013.01); *H04N 2201/0039* (2013.01); *H04N 2201/0074* (2013.01); *H04N 2201/0094* (2013.01)

(58) Field of Classification Search
  CPC ................................................. H04N 1/00347
  See application file for complete search history.

(56) References Cited

U.S. PATENT DOCUMENTS

| 2005/0024694 | A1* | 2/2005 | Itoh ..................... H04N 1/32005 358/500 |
| 2006/0139661 | A1* | 6/2006 | Kumashio ...................... 358/1.1 |
| 2007/0279667 | A1* | 12/2007 | Hattori ............... H04N 1/32561 358/1.13 |
| 2008/0218788 | A1* | 9/2008 | Mimura ....................... 358/1.15 |

FOREIGN PATENT DOCUMENTS

JP   2007-088663 A   4/2007

OTHER PUBLICATIONS

Machine English translation of JP 2007088663.*

* cited by examiner

*Primary Examiner* — Nicholas Pachol
*Assistant Examiner* — Lennin Rodriguezgonzalez
(74) *Attorney, Agent, or Firm* — Rossi, Kimms & McDowell LLP

(57) ABSTRACT

An image processing system capable of executing a processing flow in a destination image processing apparatus without retransmitting the processing flow from a source image processing apparatus to the destination image processing apparatus when the version of the destination image processing apparatus is upgraded. The source image processing apparatus analyzes whether or not the processing flow is executable by the destination image processing apparatus before transmitting the processing flow, and if it is unexecutable, the source image processing apparatus performs alternate configuration of an inexecutable setting based on the analysis result. The source image processing apparatus transmits the processing flow including the alternate setting to the destination image processing apparatus. If the destination image processing apparatus fails in executing the processing flow, the destination image processing apparatus executes the processing flow based on the alternate setting included in the received processing flow.

8 Claims, 20 Drawing Sheets

FIG. 7

```xml
<?xml version="1.0" encoding="utf-8"?>
<Workflow id="1" captain="PDF PROCESSING" comment="..." date"...">
  <Function id="Scan">
    <Setting>...</Setting>
  </Function>
  <Function id="Send">
    <Element id="FILE FORMAT" exflag="0">
      <Item id="1">XPS</Item>
    </Element>
  </Function>
</Workflow>
```

ANALYSIS RESULT LIST 311

| No. | FUNCTION | ELEMENT | ITEM | DETERMINATION | EXECUTABLE PARAMETER |
|---|---|---|---|---|---|
| 1 | SCAN | ELEMENT1 | ITEM1 | EXECUTABLE | |
| 2 | | | ITEM2 | EXECUTABLE | |
| 3 | SEND | FILE FORMAT | XPS | INEXECUTABLE | PARAMETER LIST A |
| 4 | | | | | |

905

PARAMETR LIST A 904

| No. | EXECUTABLE PARAMETER |
|---|---|
| 3-1 | PDF |
| 3-2 | JPEG |
| 3-3 | TIFF |

FIG. 14

```
<?xml version="1.0" encoding="utf-8"?>
<Workflow id="1" captain="CONVERSION CONFIGURATION PROCESS" comment="..." date"...">
  <Function id="Scan">
    <Setting>...</Setting>
  </Function>                              1401
  <Function id="Send">
    <Element id="FILE FORMAT" exflag="1">
      <Item id="1">PDF</Item>              1402
    </Element>
  </Function>
</Workflow>
```

```
<?xml version="1.0" encoding="utf-8"?>
<Workflow id="1" captain="ALTERNATE CONFIGURATION PROCESS" comment="..." date"...">
<Function id="Scan">
<Setting>...</Setting>
</Function>                         ~1701
<Function id="Send">
<Element id="FILE FORMAT" exflag="2">
<Item id="1">XPS</Item>
<Convert>PDF</Convert>       ~1702                    ~1703
<Message>XPS IS UNSUPPORTED, AND TRANSMISSION FILE FORMAT IS
          SUBJECTED TO CONVERSION FROM XPS TO PDF</Message>
</Element>
</Function>
</Workflow>
```

1700

IMAGE PROCESSING SYSTEM, INFORMATION PROCESSING APPARATUS, IMAGE PROCESSING APPARATUS, METHOD OF CONTROLLING INFORMATION PROCESSING APPARATUS, METHOD OF CONTROLLING IMAGE PROCESSING APPARATUS AND STORAGE MEDIUM

BACKGROUND OF THE INVENTION

1. Field of the Invention

The present invention relates to an image processing system including an information processing apparatus which transmits a processing flow and an image processing apparatus which executes the received processing flow, the information processing apparatus and the image processing apparatus as components of the image processing system, a method of controlling the information processing apparatus, and a method of controlling the image processing apparatus.

2. Description of the Related Art

As an image processing apparatus, there has been proposed one equipped with a plurality of functions, such as a print function, a scan function, an e-mail transmission function, and a facsimile transmission function. A combination of a plurality of processes (hereinafter referred to as "tasks") to be executed by functions equipped in such an image processing apparatus, which is formed by connecting the tasks into a sequence for time-series execution and contains settings, is called a processing flow. This processing flow is displayed for execution as a button or the like on a display section, and is executed when the button is depressed by a user.

This processing flow can be shared between image processing apparatuses of different models. For example, a processing flow created in a source image processing apparatus can be transmitted to a destination image processing apparatus and be executed thereby.

However, when the processing flow created in the source image processing apparatus is transmitted to the destination image processing apparatus and is executed thereby, if there is a function which is equipped in the source image processing apparatus but not equipped in the destination image processing apparatus, results of the execution of the processing flow by the destination image processing apparatus are different from those of the execution of the same to be obtained by the source image processing apparatus. This makes it impossible to execute the processing flow as intended by the user.

As a method of sharing a processing flow between the different models, for example, there has been proposed a technique in which a source image processing apparatus transmits a processing flow to a destination image processing apparatus via a processing flow management server.

In this proposal, if the processing flow management server determines that it is not possible to execute the received processing flow in the destination image processing apparatus, the processing flow management server transmits a range of settings that can be executed to the source image processing apparatus. Then, the processing flow management server causes the display section of the source image processing apparatus to display a selection screen for selecting settings from the range.

Another image processing apparatus has been proposed which receives desired values input by a user and converts the configuration of a processing flow into a form also executable by a destination image processing apparatus according to the desired values (see Japanese Patent Laid-Open Publication No. 2007-088663).

By the way, when transmitting the processing flow to the destination image processing apparatus, the source image processing apparatus sometimes converts the processing flow in respect of a function thereof, and in this case, the converted processing flow becomes different from the processing flow intended by the user.

On the other hand, the version of an application stored in the destination image processing apparatus, which receives a processing flow, or that of controller firmware of the destination image processing apparatus itself is sometimes upgraded, and with this upgrade, the destination image processing apparatus becomes capable of executing the processing flow as intended by the user.

However, in this case, the processing flow has been converted in respect of a function by the source image processing apparatus, and hence to execute the processing flow as intended by the user, it is required to transmit the processing flow again from the source image processing apparatus to the destination image processing apparatus.

SUMMARY OF THE INVENTION

The present invention provides an image processing system that is capable of executing a processing flow in the destination image processing apparatus without transmitting the processing flow from the source image processing apparatus to the destination image processing apparatus again, even when the destination image processing apparatus has its version upgraded.

In a first aspect of the present invention, there is provided an image processing system including an information processing apparatus that transmits a processing flow defining processing contents formed by combining processes to be executed by a plurality of functions into a series of processes for execution, and an image processing apparatus that receives and executes the processing flow transmitted from the information processing apparatus, comprising an acquisition unit adapted to acquire device information of the image processing apparatus, an identification unit adapted to identify a setting which cannot be set by the image processing apparatus, out of settings contained in the processing flow, based on the device information of the image processing apparatus acquired by the acquisition unit, a determination unit adapted to determine an alternate setting which can be set by the image processing apparatus, for the setting identified by the identification unit, an alternate processing flow configuration unit adapted to configure an alternate processing flow which enables selective execution of either of the processing contents including the setting identified by the identification unit and processing contents including the alternate setting, based on the processing flow, the setting identified by the identification unit, and the alternate setting determined by the determination unit, and a transmission unit adapted to transmit the alternate processing flow to the image processing apparatus.

In a second aspect of the present invention, there is provided an information processing apparatus that stores a processing flow defining processing contents formed by combining processes to be executed by a plurality of functions into a series of processes for execution, comprising an identification unit adapted to identify a setting which cannot be set by an image processing apparatus as a destination to which the processing flow is to be transmitted, out of settings contained in the processing flow, based on device information of the image processing apparatus, a determination unit adapted to determine an alternate setting which can be set by the image processing apparatus, for the setting identified by the identification unit, an alternate processing flow configuration unit adapted to configure an alternate processing flow which enables selective execution of either of the processing contents including the setting identified by the identification unit and processing contents including the alternate setting, based on the processing flow, the setting identified by the identification unit, and the alternate setting determined by the determination unit, and a transmission unit adapted to transmit the alternate processing flow to the image processing apparatus.

In a third aspect of the present invention, there is provided an image processing apparatus that executes a processing flow defining processing contents formed by combining processes to be executed by a plurality of functions into a series of processes for execution, comprising a reception unit adapted to receive the processing flow from an information processing apparatus, and an execution unit adapted to execute the processing flow received from the information processing apparatus, wherein when the processing flow contains a setting which cannot be set by the image processing apparatus, the execution unit sets an alternate setting for the setting which cannot be set by the image processing apparatus.

In a fourth aspect of the present invention, there is provided a method of controlling an information processing apparatus that stores a processing flow defining processing contents formed by combining processes to be executed by a plurality of functions into a series of processes for execution, comprising identifying a setting which cannot be set by an image processing apparatus as a destination to which the processing flow is to be transmitted, out of settings contained in the processing flow, based on device information of the image processing apparatus, determining an alternate setting which can be set by the image processing apparatus, for the setting identified by the identifying, configuring an alternate processing flow which enables selective execution of either of the processing contents including the setting identified by the identifying and processing contents including the alternate setting, based on the processing flow, the setting identified by the identifying, and the alternate setting determined by the determining, and transmitting the alternate processing flow to the image processing apparatus.

In a fifth aspect of the present invention, there is provided a method of controlling an image processing apparatus that executes a processing flow defining processing contents formed by combining processes to be executed by a plurality of functions into a series of processes for execution, comprising receiving the processing flow from an information processing apparatus, and executing the processing flow received from the information processing apparatus, wherein when the processing flow contains a setting which cannot be set by the image processing apparatus, the executing includes setting an alternate setting for the setting which cannot be set by the image processing apparatus.

In a sixth aspect of the present invention, there is provided a storage medium storing a program for causing a computer to execute a method of controlling an information processing apparatus that stores a processing flow defining processing contents formed by combining processes to be executed by a plurality of functions into a series of processes for execution, wherein the method comprises identifying a setting which cannot be set by an image processing apparatus as a destination to which the processing flow is to be transmitted, out of settings contained in the processing flow, based on device information of the image processing apparatus, determining an alternate setting which can be set by the image processing apparatus, for the setting identified by the identifying, configuring an alternate processing flow which enables selective execution of either of the processing contents including the setting identified by the identifying and processing contents including the alternate setting, based on the processing flow, the setting identified by the identifying, and the alternate setting determined by the determining, and transmitting the alternate processing flow to the image processing apparatus.

In a seventh aspect of the present invention, there is provided a program for causing a computer to execute a method of controlling an image processing apparatus that executes a processing flow defining processing contents formed by combining processes to be executed by a plurality of functions into a series of processes for execution, wherein the method comprises receiving the processing flow from an information processing apparatus, and executing the processing flow received from the information processing apparatus, wherein when the processing flow contains a setting which cannot be set by the image processing apparatus, the executing includes setting an alternate setting for the setting which cannot be set by the image processing apparatus.

According to the present invention, it is possible to set an alternate process in advance by the source image processing apparatus in case of failure of execution of a processing flow by the destination image processing apparatus. This setting of the alternate process does not mean the conversion of the processing flow itself, but the provision of settings for reference in case of failure of execution of the processing flow by the image processing apparatus.

Therefore, if the upgrade of the version of the application or that of the controller firmware has made the destination image processing apparatus (receiving side) compatible with a process which is originally intended by the processing flow, it is possible to refer to the original settings, not the alternate settings. Therefore, when the destination image processing apparatus has its version upgraded, it is possible to execute the processing flow by the destination image processing apparatus without retransmitting the processing flow from the source information processing apparatus to the destination image processing apparatus.

Further features of the present invention will become apparent from the following description of exemplary embodiments with reference to the attached drawings.

BRIEF DESCRIPTION OF THE DRAWINGS

FIG. 7 is a diagram showing the definition of the processing flow transmitted from the source image processing apparatus to the destination image processing apparatus.

FIG. 9 is a diagram showing an example of an analysis result list.

FIG. 14 is a diagram showing the definition of the processing flow after parameter replacement is performed.

FIG. 17 is a diagram showing the definition of the processing flow when the processing flow alternate configuration is completed.

DETAILED DESCRIPTION OF THE EMBODIMENTS

The present invention will now be described in detail below with reference to the accompanying drawings showing embodiments thereof.

Figure 1:
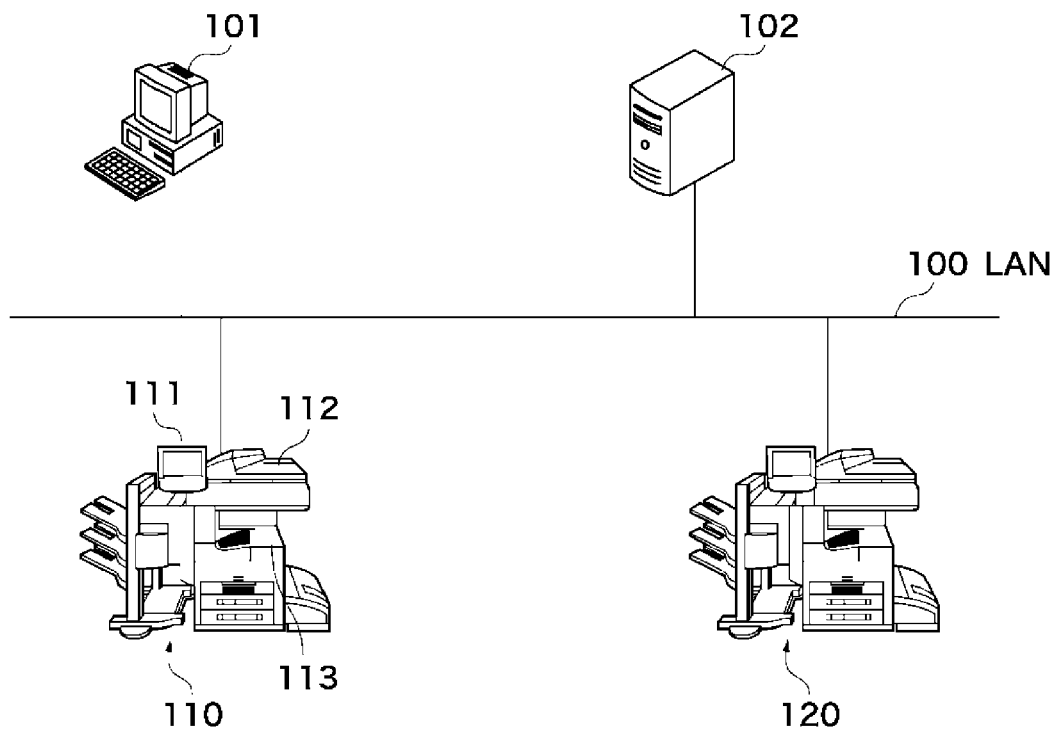
FIG. 1 is a diagram useful in explaining the configuration of an image processing system according to a first embodiment of the present invention.

FIG. 1 is a diagram useful in explaining the configuration of an image processing system according to a first embodiment of the present invention.

As shown in FIG. 1, the image processing system of the present embodiment is comprised of an image processing apparatus 110, an image processing apparatus 120, a client PC 101, and a device management server 102, which are interconnected by a communicating means, e.g. a LAN 100, such that they are capable of communicating with each other. It should be noted the communicating means is not limited to the LAN, but a desired network, such as a WAN (wide area network) including a public communication line, a serial transmission method such as USB, a parallel transmission system method as Centronics or SCSI, can also be applied thereto.

In the present embodiment, the image processing apparatuses 110 and 120 have the same configuration, and therefore, a description will be given of the image processing apparatuses 110. The image processing apparatuses 110 is comprised of a scanner section 112, a printer section 113, and an operating section 111, and also has a copy function and a facsimile function.

Further, the image processing apparatus 110 has a data transmission function for transmitting image data of an original scanned by the scanner section 112, to a designated apparatus on the LAN 100. Further, the image processing apparatus 110 is capable of creating an e-mail with an image as an attached file, and transmitting the e-mail using a mail server, not shown. Further, the image processing apparatus 110 has a PDL (Page Description Language) interpretation function and a rendering function, and is capable of receiving PDL data from the client PC 101 connected to the LAN 100, and printing the same by the printer section 113.

Figure 2:
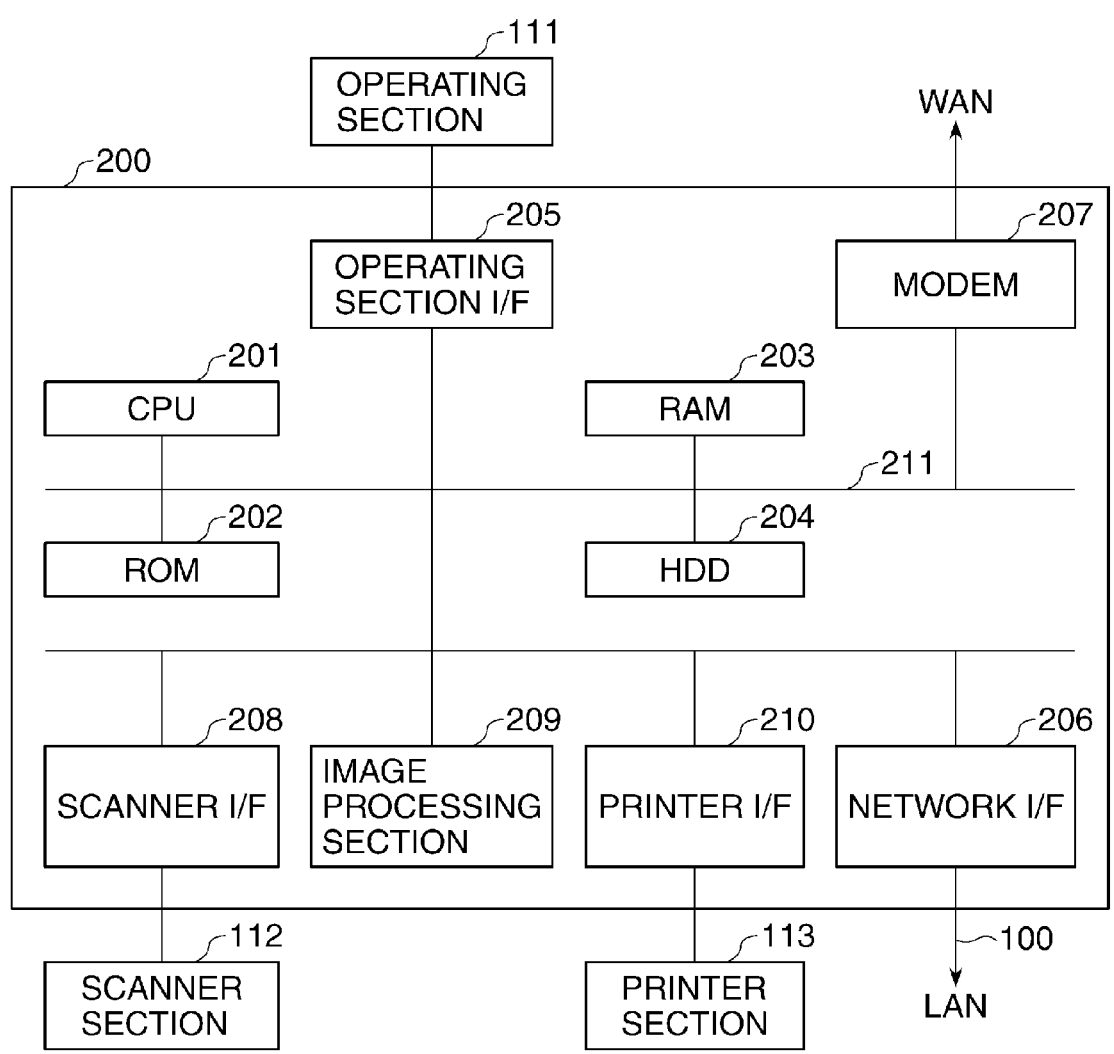
FIG. 2 is block diagram of a control system of an image processing apparatus appearing in FIG. 1.

Further, the image processing apparatus 110 is capable of storing image data scanned by the scanner section 112, or PDL data designated by the client PC 101 in a specific area of an HDD 204 (see FIG. 2). Further, the image processing apparatus 110 is capable of storing the image data of the original scanned by the scanner section 112 in the HDD 204 as digital image data, and printing the digital image data stored in the HDD 204 by the printer section 113.

The device management server 102 is capable of managing statuses of the image processing apparatuses 110 and 120 concerning e.g. toner shortage and paper jam, and logs of jobs concerning scanning, printing, transmission, etc., and further of compiling accounting information, for example. Further, the device management server 102 is capable of upgrading the version of each application in the image processing apparatuses 110 and 120 by distributing the application thereto. Further, the device management server 102 is capable of upgrading the version of controller firmware itself of the image processing apparatuses 110 and 120 by distributing the controller firmware thereto.

FIG. 2 is block diagram of a control system of each of the image processing apparatuses 110 and 120.

As shown in FIG. 2, the operating section 111, the scanner section 112, and the printer section 113 are electrically connected to a controller 200.

The scanner section 112 inputs reflected light obtained by exposure scanning of an image of the original, to CCD sensors and the like, to thereby convert information of the image into electrical signals. Further, the scanner section 112 converts the resultant electrical signals into respective luminance signals of the colors of R, G, and B, and delivers the luminance signals to the controller 200 as the digital image data.

Incidentally, originals are set on a document feeder, and when the user instructs to start scanning of the originals from the operating section 111, an instruction for scanning the originals is given from the controller 200 to the scanner section 112. When the scanner section 112 receives the instruction for scanning the originals, the scanner section 112 feeds the originals one by one from the document feeder and performs an operation for scanning each original. The method of scanning the original may not be an automatic feeding method using the document feeder, but be a method of manually placing each original on a platen glass, not shown, and performing scanning by moving an exposure section.

The printer section 113 forms the image data received from the controller 200 on a sheet as an image. It should be noted that although the image forming method used in the present embodiment is an electrophotographic method using a photosensitive drum and a photosensitive belt, this is not limitative, but it is possible to use e.g. an inkjet method of printing out an image on a sheet by discharging ink from a fine nozzle array.

The controller 200 is comprised of a CPU 201, a ROM 202, a RAM 203, the HDD 204, an operating section interface 205, a network interface 206, a modem 207, a scanner interface 208, an image processing section 209, and a printer interface 210.

The CPU 201 controls the overall operation of the image processing apparatus 110 according to a control program and the like stored in the ROM 202.

The ROM 202 stores a boot program, etc. The RAM 203 is a system work memory for operating the CPU 201, and at the same time, a memory for temporarily storing image data. Further, the RAM 203 is formed by an area in which data stored therein is preserved by back-up power supply even after the power of the apparatus is switched off, and an area in which data stored therein is deleted after the power is switched off.

The HDD 204 is a hard disk drive which stores system software and image data. The operating section interface 205 is an interface section for connecting a system bus 211 and the operating section 111. The operating section interface 205 receives image data to be displayed on the operating section 111 from the system bus 211 and outputs the same to the operating section 111. The operating section interface 205 also receives information input from the operating section 111 and outputs the same to the system bus 211.

The network interface 206 connects between the LAN 100 and the system bus 211, and performs inputting and outputting of information. The modem 207 connects between the WAN and the system bus 211, and performs inputting and outputting of information.

The scanner interface 208 performs correction, processing, and editing of image data received from the scanner section 112. It should be noted that the scanner interface 208 has a function of determining whether the received image data is of a color original or of a monochrome original, whether it is of a character original or of a picture original, etc.

The image processing section 209 performs turning, compression, expansion, or the like on image data. Further, the image processing section 209 is capable of combining images stored in the HDD 204 into one image.

The printer interface 210 receives image data transmitted from the image processing section 209, performs image formation based on the image data while referring to attribute data attached to the image data, and delivers the image data having been subjected to the image formation to the printer section 113.

An instruction from the user to the image processing apparatus 110 and presentation of information to the user may be performed, for example, via the operating section 111, or via the client PC 104 connected to the image processing apparatus 110 via the LAN 100.

Figure 3:
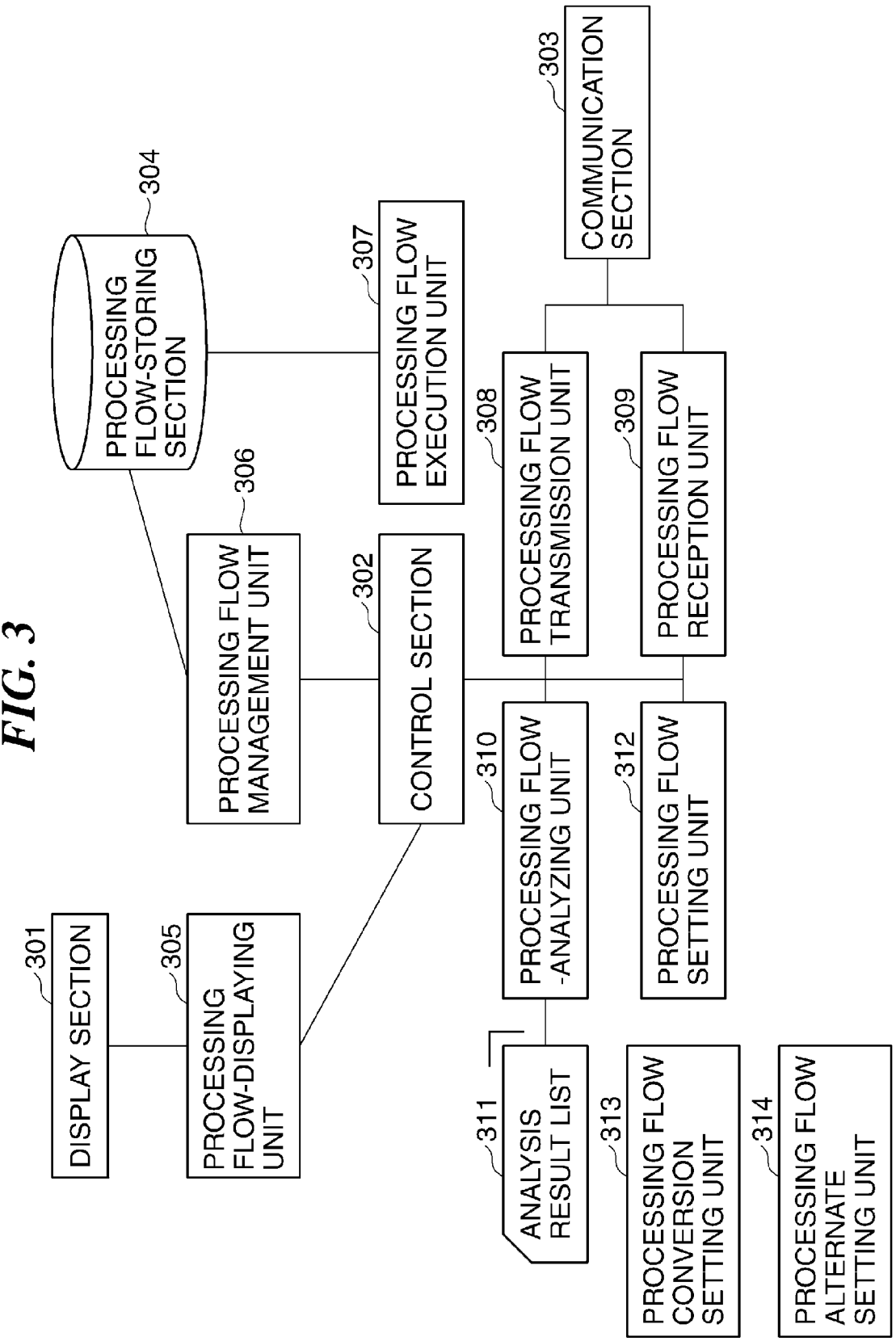
FIG. 3 is a block diagram showing a configuration of software modules executed by a CPU of the image processing apparatus shown in FIG. 2.

FIG. 3 is a block diagram showing a configuration of software modules executed by the CPU 201.

In FIG. 3, a display section 301 is a software module for performing display on the operating section 111 via the operating section interface 205, and for processing input from the operating section 111 by the user.

A control section 302 is a key software module for controlling various kinds of hardware of the controller 200, functions of the software modules operating in a manner associated with each other, and so forth.

A communication section 303 is a software module for performing communication by operating the network interface 206 and the modem 207.

A processing flow-storing section 304 is an area for storing a processing flow, and is provided within the HDD 204. The processing flow represents a sequence of processes which is to be executed by a combination of a plurality of functions equipped in the image processing apparatuses 110 and 210. Details of processing by the processing flow will be described hereinafter.

A processing flow-displaying unit 305 is a software module for passing information on the display of the processing flow between the control section 302 the display section 301.

A processing flow management unit 306 is a software module for performing management of the processing flow-storing section 304, including reading of the processing flow from the processing flow-storing section 304, and storing of the processing flow in the processing flow-storing section 304.

A processing flow execution unit 307 is a software module for executing the processing flow.

A processing flow transmission unit 308 is a software module for transmitting the processing flow to the other image processing apparatus 120 (or 110).

A processing flow reception unit 309 is a software module for receiving the processing flow from the other image processing apparatus 120 (or 110).

A processing flow-analyzing unit 310 is a software module for analyzing whether or not the processing flow received by the processing flow reception unit 309 can be executed by the image processing apparatus 110. If the processing flow can be executed, the processing flow-analyzing unit 310 records the analysis result that the processing flow can be executed in an analysis result list 311, whereas if the processing flow cannot be executed, the processing flow-analyzing unit 310 records the analysis result that the processing flow cannot be executed in the analysis result list 311. Further, if the processing flow cannot be executed, in addition to the analysis result, the processing flow-analyzing unit 310 records inexecutable parameter information in the analysis result list 311.

A processing flow setting unit 312 is a software module for performing a processing flow configuration process based on the inexecutable parameter information in the analysis result list 311 in the case where the processing flow of which the analysis result is obtained by the processing flow-analyzing unit 310 and is stored in the analysis result list 311 is inexecutable.

A processing flow conversion setting unit 313 is a software module for performing a converted processing flow generation process in a case where a processing flow conversion configuration is selected by the processing flow setting unit 312.

An processing flow alternate setting unit 314 is a software module for performing an alternate processing flow configuration process in a case where a processing flow alternate configuration is selected by the processing flow setting unit 312.

Figure 4:
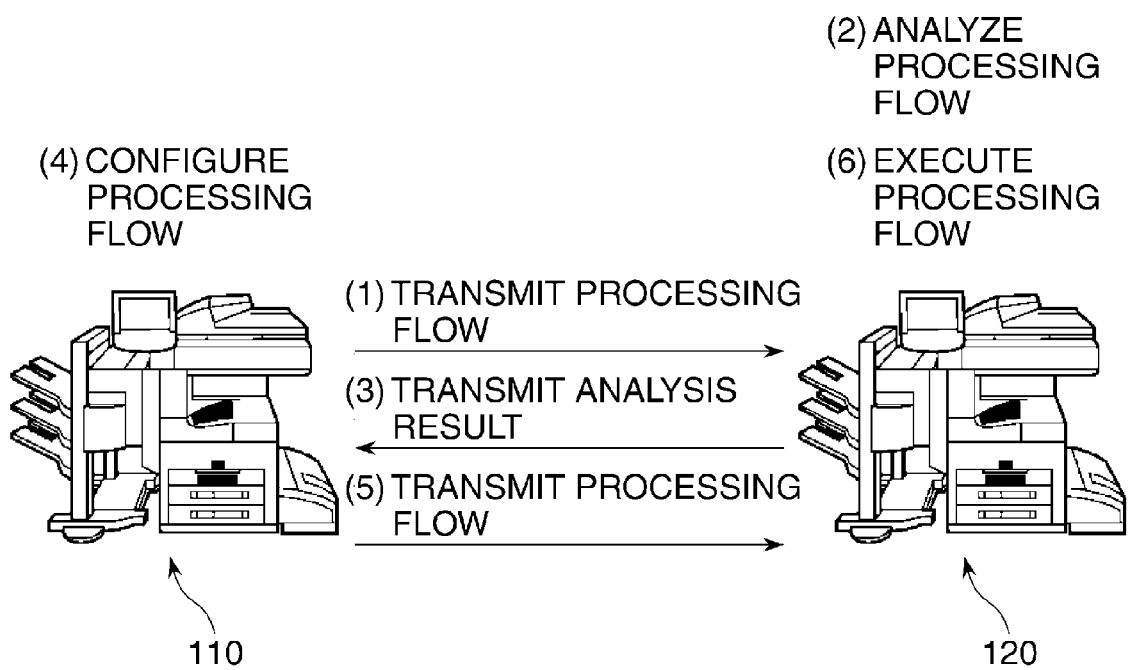
FIG. 4 is a diagram useful in explaining a processing sequence when a processing flow is transmitted from a source image processing apparatus to a destination image processing apparatus.

FIG. 4 is a diagram useful in explaining a processing sequence when a processing flow is transmitted from the image processing apparatus 110 to the image processing apparatus 120.

First, a desired processing flow selected by the user is transmitted from the image processing apparatus 110 to the image processing apparatus 120 ((1) TRANSMIT PROCESSING FLOW in FIG. 4).

The image processing apparatus 120 analyzes whether or not the received processing flow can be executed by the image processing apparatus 120 ((2) ANALYZE PROCESSING FLOW in FIG. 4). Further, the image processing apparatus 120 transmits the analysis result to the image processing apparatus 110 ((3) TRANSMIT ANALYSIS RESULT in FIG. 4).

If the received analysis result is that the processing flow cannot be executed, the image processing apparatus 110 configures the processing flow in case of unsuccessful execution of the processing flow by the image processing apparatus 120 ((4) CONFIGURE PROCESSING FLOW in FIG. 4). Further, the image processing apparatus 110 transmits the configured processing flow to the image processing apparatus 120 ((5) TRANSMIT PROCESSING FLOW in FIG. 4).

The image processing apparatus 120 executes the received processing flow, and if the execution is unsuccessful, the image processing apparatus 120 executes the configured processing flow formed by the processing flow setting unit 312 ((6) EXECUTE PROCESSING FLOW in FIG. 4).

It should be noted that in the present embodiment, a personal computer may serve as the image processing apparatus 110 on a source side from which the processing flow is transmitted. In the present embodiment, the image processing apparatus, the personal computer or the like is generically referred to as an information processing apparatus.

Figure 5:
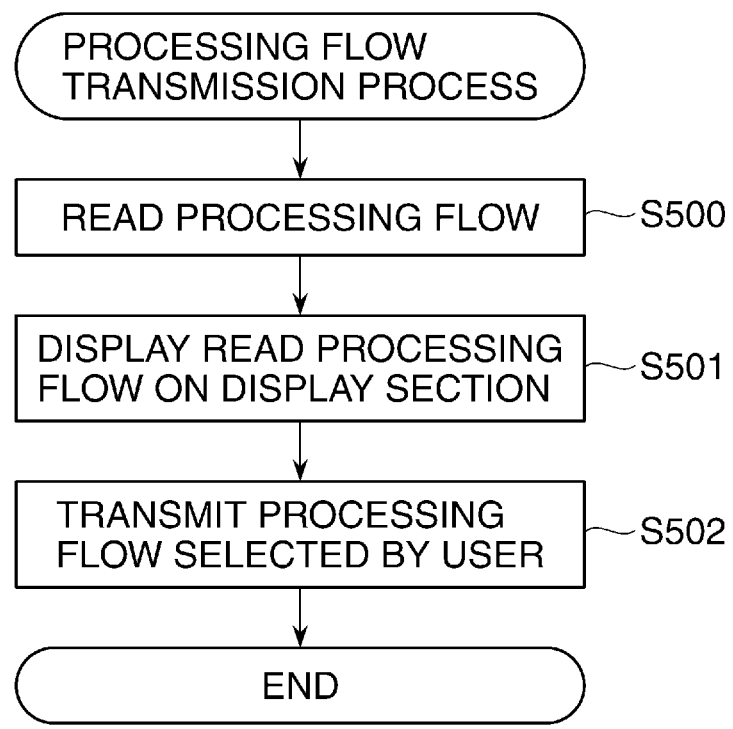
FIG. 5 is a flowchart of a processing flow transmission process executed by the source image processing apparatus, for transmitting the processing flow to the destination image processing apparatus.

FIG. 5 is a flowchart of a processing flow transmission process executed by the image processing apparatus 110, for transmitting the processing flow to the image processing apparatus 120. The processing flow transmission process in FIG. 5 corresponds to "(1) TRANSMIT PROCESSING FLOW" in FIG. 4, and is executed by the CPU 201 by loading a program stored in the ROM 202, the HDD 204 or the like of the image processing apparatus 110 into the RAM 203.

In a step S500, the CPU 201 controls the processing flow management unit 306 to read out a processing flow stored in the processing flow-storing section 304, and the process proceeds to a step S501.

In the step S501, the CPU 201 causes the processing flow-displaying unit 305 to display a processing flow transmission configuration screen 600 (see FIG. 6) on the display section 301, and the process proceeds to a step S502.

In the step S502, the CPU 201 causes the processing flow transmission unit 308 to transmit the processing flow selected on the processing flow transmission configuration screen 600 by the user to the image processing apparatus 120 via the communication section 303, followed by terminating the present process.

Figure 6:
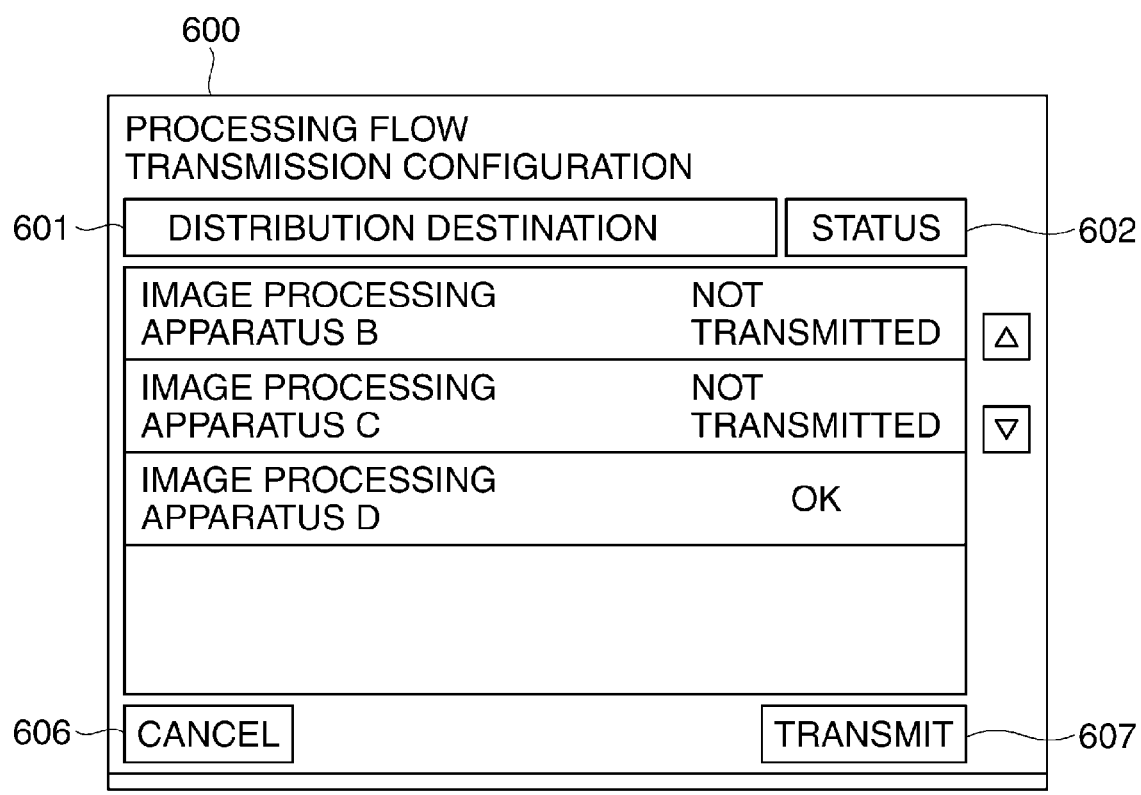
FIG. 6 is a diagram showing an example of a processing flow transmission configuration screen which is displayed on a display section of the source image processing apparatus in a step S501 in FIG. 5.

FIG. 6 is a diagram showing an example of the processing flow transmission configuration screen 600 which is displayed on the display section 301 in the step S501 in FIG. 5.

As shown in FIG. 6, a distribution destination 601 and a status 602 are displayed on the processing flow transmission configuration screen 600. In the illustrated example, the processing flow has not been transmitted to image processing apparatuses B and C, but it has been transmitted to an image processing apparatus D and OK is displayed. To cancel the transmission of the processing flow, a cancel button 606 is depressed, whereas to execute the transmission of the processing flow, a transmission button 607 is depressed.

FIG. 7 is a diagram showing a definition 700 of the processing flow transmitted from the image processing apparatus 110 to the image processing apparatus 120 in the step S502 in FIG. 5.

As shown in FIG. 7, the definition 700 of the processing flow has a hierarchical structure. In the illustrated example, a scan process 701 and a transmission process 702 are defined, and as one of components of the transmission process, a file format process 703 exists. In this case, an XPS (XML Paper Specification) 704 is selected as the file format. Further, although it is assumed in the present embodiment that the definition of the processing flow is described in XML, any other description method may be employed.

Figure 8:
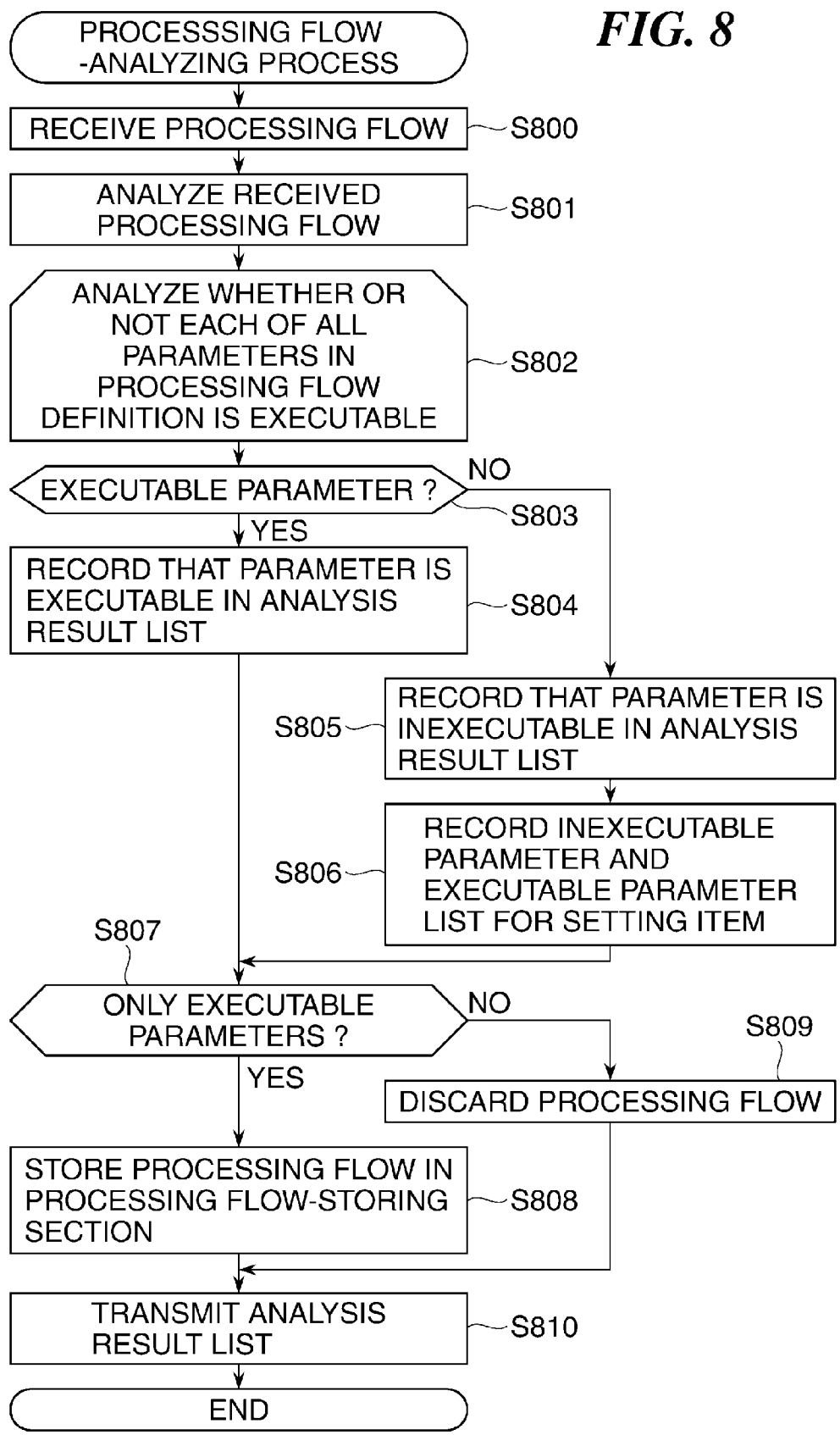
FIG. 8 is a flowchart of a processing flow-analyzing process executed by the destination image processing apparatus, for determining whether or not the processing flow received from the source image processing apparatus can be executed.

FIG. 8 is a flowchart useful in explaining a processing flow-analyzing process for determining whether or not the processing flow received from the image processing apparatus 110 can be executed. The processing flow-analyzing process in FIG. 8 corresponds to "(2) ANALYZE PROCESSING FLOW" in FIG. 4, and is executed by the CPU 201 by loading a program stored in the ROM 202, the HDD 204 or the like of the image processing apparatus 120 into the RAM 203. For convenience of description, the CPU 201 of the image processing apparatus 120 will be referred to hereafter as the CPU 201A.

In a step S800, the CPU 201A receives the processing flow transmitted from the image processing apparatus 110 via the communication section 303, using the processing flow reception unit 309, and then the process proceeds to a step S801.

In the step S801, the CPU 201A starts to analyze the processing flow received in the step S800, using the processing flow-analyzing unit 310, and then the process proceeds to a step S802.

In the step S802, to determine whether or not the received processing flow can be executed by the image processing apparatus 120, the CPU 201A causes the processing flow-analyzing unit 310 to analyze each of all parameters in the definition of the processing flow and thereby determine whether or not the parameter is executable.

Here, the parameter analysis by the processing flow-analyzing unit 310 for determining whether or not each parameter is executable is performed by checking whether or not settings in the definition of the received processing flow, i.e. settings of the respective items (processes) denoted by the reference numerals 701 to 704 in FIG. 7 exist as values of setting items of the image processing apparatus 120.

Next, in a step S803, if the CPU 201A determines that any setting in the received processing flow does not exist as a value of a setting item of the image processing apparatus 120 (or the received setting cannot be set by the image processing apparatus 120), the process proceeds to a step S805. In this case, the CPU 201A determines that the setting is an inexecutable parameter. Further, if the setting of the received processing flow exists as the value of the setting item of the image processing apparatus 120, the CPU 201A determines that the setting is an executable parameter, so that the process proceeds to a step S804.

In the step S804, the CPU 201A causes the processing flow-analyzing unit 310 to record the analysis result that the setting in the received processing flow is an executable parameter, in the analysis result list 311.

On the other hand, in the step S805, the CPU 201A causes the processing flow-analyzing unit 310 to record the analysis result that the setting in the received processing flow is an inexecutable parameter, in the analysis result list 311, and then the process proceeds to a step S806.

In the step S806, the CPU 201A records the inexecutable parameter and a list of executable parameters of the setting item (e.g. file format) in the analysis result list 311 by the processing flow-analyzing unit 310.

A description will be specifically given of the processes in the steps S803 to 806 with reference to FIG. 9.

FIG. 9 is a diagram showing an example of the analysis result list 311, which tabulates results of analysis of the definition 700 of the processing flow in FIG. 7. No. 1 and No. 2 in the analysis result list 311 correspond to analysis results obtained by analyzing the setting items denoted by the reference numeral 701 in FIG. 7.

As for this case, the setting items defined by the reference numeral 701 in FIG. 7 exist in the image processing apparatus 120, it is determined in the step S803 that they are executable parameters, and analysis results indicating that the parameters are executable are recorded in the analysis result list 311 in the step S804.

No. 3 in the analysis result list 311 corresponds to an analysis result obtained by analyzing the setting items denoted by the reference numerals 702 to 704 in FIG. 7. As for this case, it is determined in the step S803 that XPS is inexecutable as the file format of a transmission task, and an analysis result indicating that the parameter is inexecutable is recorded in the analysis result list 311 in the step S805.

In the step S806, the inexecutable parameter is recorded in the analysis result list 311, and further, parameters other than XPS each of which can be executed by the image processing apparatus 120 as the file format are recorded in the analysis result list 311 as a parameter list 904.

Referring again to FIG. 8, in a step S807, after completion of analysis of all the parameters defined in the processing flow, the CPU 201A checks using the processing flow-analyzing unit 310 whether or not there is any executable parameter in the analysis result list 311.

Then, if the CPU 201A determines that there are only executable parameters, the process proceeds to a step S808, whereas if the CPU 201A determines that there is any executable parameter, the process proceeds to a step S809.

In the step S808, the CPU 201A causes the processing flow management unit 306 to store the received processing flow in the processing flow-storing section 304.

On the other hand, in the step S809, the CPU 201A causes the processing flow management unit 306 to discard the received processing flow.

Next, in a step S810, the CPU 201A causes the processing flow transmission unit 308 to transmit the analysis result list 311 of which a column of determination 905 recording a result of analysis of each of all the parameters by the processing flow-analyzing unit 310, indicating whether the parameter is executable or not, to the image processing apparatus 110 via the communication section 303 (corresponds to "(3) TRANSMIT ANALYSIS RESULT" in FIG. 4), followed by terminating the present process.

Figure 10:
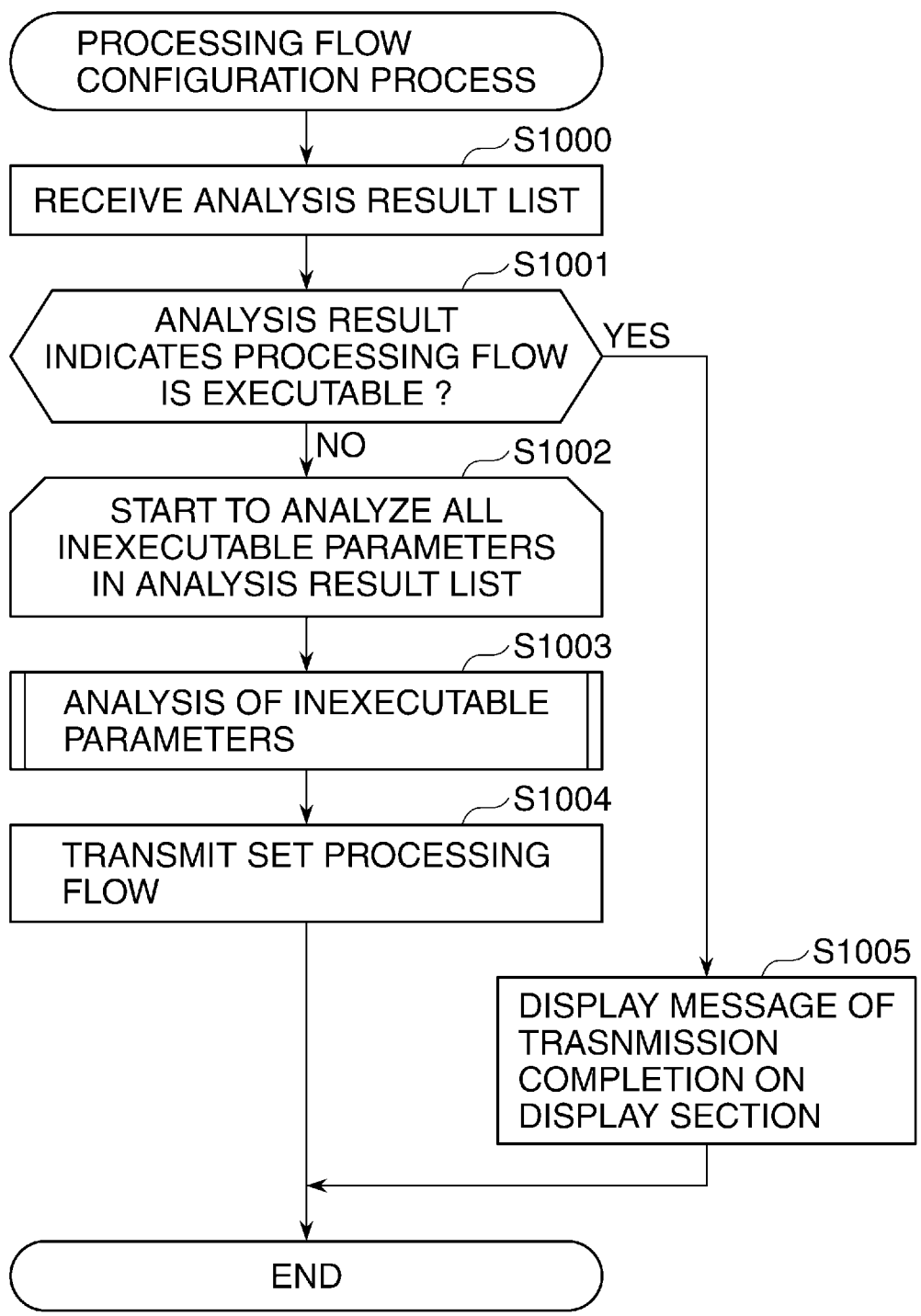
FIG. 10 is a flowchart of a processing flow configuration process executed by the source image processing apparatus.

FIG. 10 is a flowchart of a processing flow configuration process executed by the image processing apparatus 110. The processing flow configuration process in FIG. 10 corresponds to "(4) CONFIGURE PROCESSING FLOW" in FIG. 4, and is executed by the CPU 201 by loading a program stored in the ROM 202, the HDD 204 or the like of the image processing apparatus 110 into the RAM 203.

In a step S1000, the CPU 201 causes the processing flow reception unit 309 to receive the analysis result list 311 from the image processing apparatus 120, and the process proceeds to a step S1001.

In the step S1001, the CPU 201 determines whether or not the analysis result of the received analysis result list 311 indicates that the processing flow is executable by referring to the column of determination 905. If the processing flow is executable, the process proceeds to a step S1005, whereas if not, the process proceeds to a step S1002.

In the step S1005, the CPU 201 causes the processing flow-displaying unit 305 to display a message saying that the transmission has been normally completed on the display section, followed by terminating the present process.

On the other hand, in the step S1002, the CPU 201 starts to analyze all of inexecutable parameters in the analysis result list 311, and the process proceeds to a step S1003.

In the step S1003, the CPU 201 performs a process for analysis of inexecutable parameters, and the process proceeds to a step S1004. Details of the process for analysis of inexecutable parameters will be described hereinafter.

In the step S1004, the CPU 201 causes the processing flow transmission unit 308 to transmit the set processing flow to the image processing apparatus 120 via the communication section 303 (corresponds to "(5) TRANSMIT PROCESSING FLOW" in FIG. 4), followed by terminating the present process.

Figure 11:
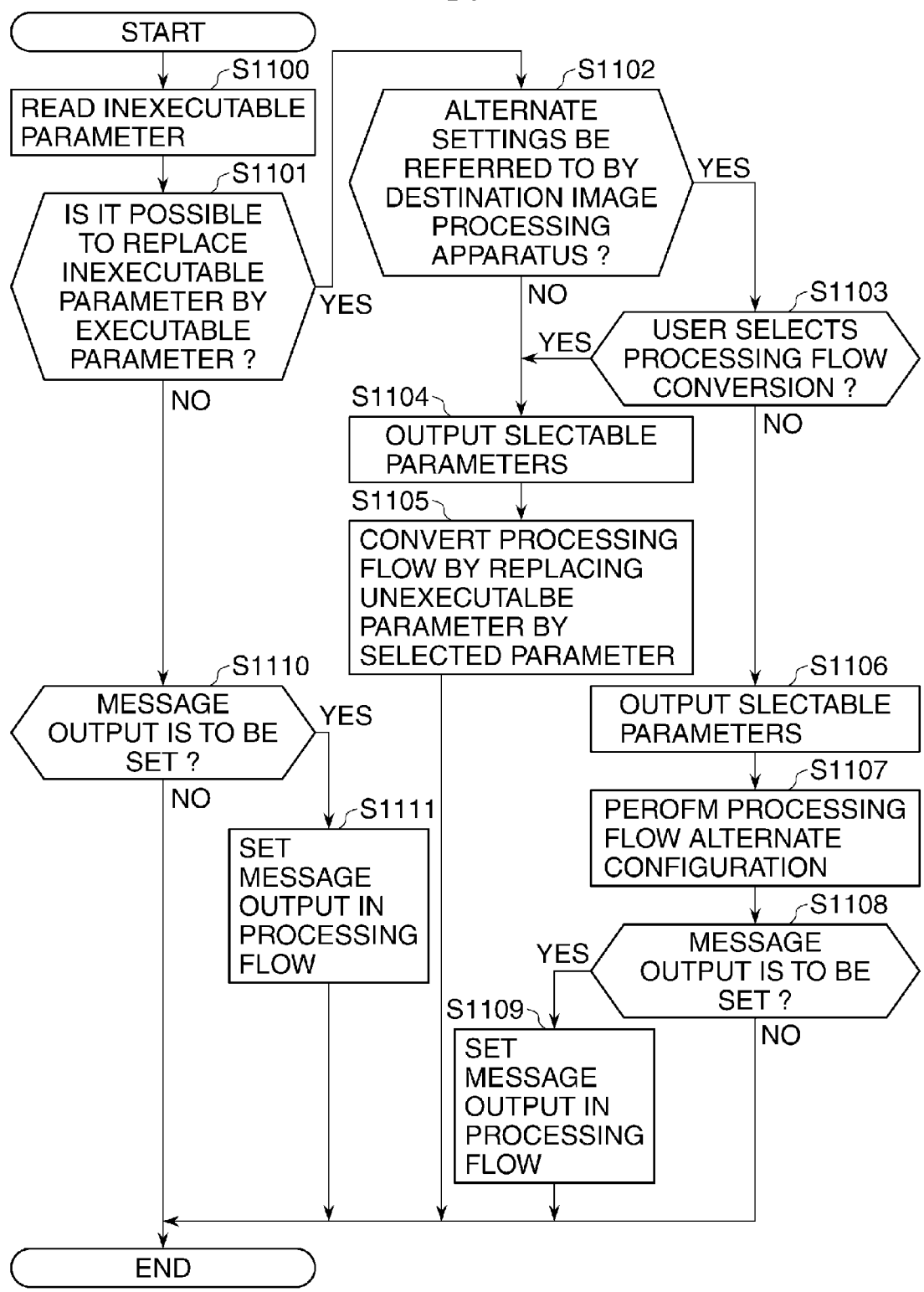
FIG. 11 is a flowchart of an analysis process for analyzing an inexecutable parameter in a step S1003 in FIG. 10.

FIG. 11 is a flowchart of the process for analysis of inexecutable parameters in the processing flow, which is executed in the step S1003 in FIG. 10.

First, in a step S1100, the CPU 201 reads in from the analysis result list 311 an inexecutable parameter and the parameter list 904 associated therewith which enumerates parameters which can be set, and the process proceeds to a step S1101.

In the step S1101, the CPU 201 compares parameters that can be set by the image processing apparatus 110 and the parameter list 904 in the analysis result list 311, which enumerates the parameters which are executable i.e. can be set, and thereby determines whether or not it is possible to replace the inexecutable parameter by any of the executable parameters.

Then, if there is found no parameter that can be set by the image processing apparatus 110 in the executable parameters of the parameter list 904 in the analysis result list 311, the CPU 201 determines that it is impossible to replace the inexecutable parameter by an executable parameter, so that the process proceeds to a step S1110.

On the other hand, if there is a parameter that can be set by the image processing apparatus 110 in the executable parameters of the parameter list 904 in the analysis result list 311, the CPU 201 determines that it is possible to replace the inexecutable parameter by an executable parameter, so that the process proceeds to a step S1102.

In the step S1102, the CPU 201 determines whether or not alternate settings set by the processing flow alternate setting unit 314 are referred to by the destination image processing apparatus 120 as required.

For example, let us consider a case in which although the image processing apparatus 110 is a color model and color scanning is set in the processing flow, the destination image processing apparatus 120 is a monochrome model and is capable of only monochrome scanning.

In this case, it is unlikely that the image processing apparatus 120 becomes compatible with color scanning by version upgrade. By preparing a list of such settings, in advance, and if it is determined that any of settings defined in the processing flow matches any of the settings in the list, it is determined that the process flow is to be subjected to processing flow conversion. In the case of the assumed example mentioned above, it is determined that color scanning should be converted to monochrome scanning.

The processing flow conversion is intended to mean converting the definition itself of a processing flow to a form that can be executed by the destination image processing apparatus 120. Further, processing flow alternate configuration is intended to mean configuring an alternate processing flow by adding, to the processing flow, alternate settings to be referred to in case of failure of the processing flow by the destination image processing apparatus 120.

The processing flow alternate configuration is not intended to mean changing the definition of the processing flow, but to mean defining a setting or settings to be referred to as an alternative to a setting or settings as the cause(s) of failure of execution of the processing flow by the destination image processing apparatus 120. Therefore, if the image processing apparatus 120 becomes compatible with the processing which is originally intended to be realized by the processing flow thanks to version upgrade of an application or the control firmware of the image processing apparatus 120, it is possible to refer to not the alternate settings but the original settings.

If the definition of the processing flow is converted by the processing flow conversion, it is not required to add an extra definition to the processing flow, but to refer to the original settings when the version of the destination image processing apparatus 120 is upgraded, which is a merit of the processing flow alternate configuration, becomes impossible. In this case, it becomes necessary to transmit the processing flow again from the image processing apparatus 110 to the image processing apparatus 120.

Then, if the CPU 201 determines that the alternate settings which are set by the processing flow alternate setting unit 314 are not referred to by the destination image processing apparatus 120 as required, the process proceeds to a step S1104. On the other hand, if the CPU 201 determines that the alternate settings which are set by the processing flow alternate setting unit 314 are referred to by the destination image processing apparatus 120 as required, the process proceeds to a step S1103.

Figure 12:
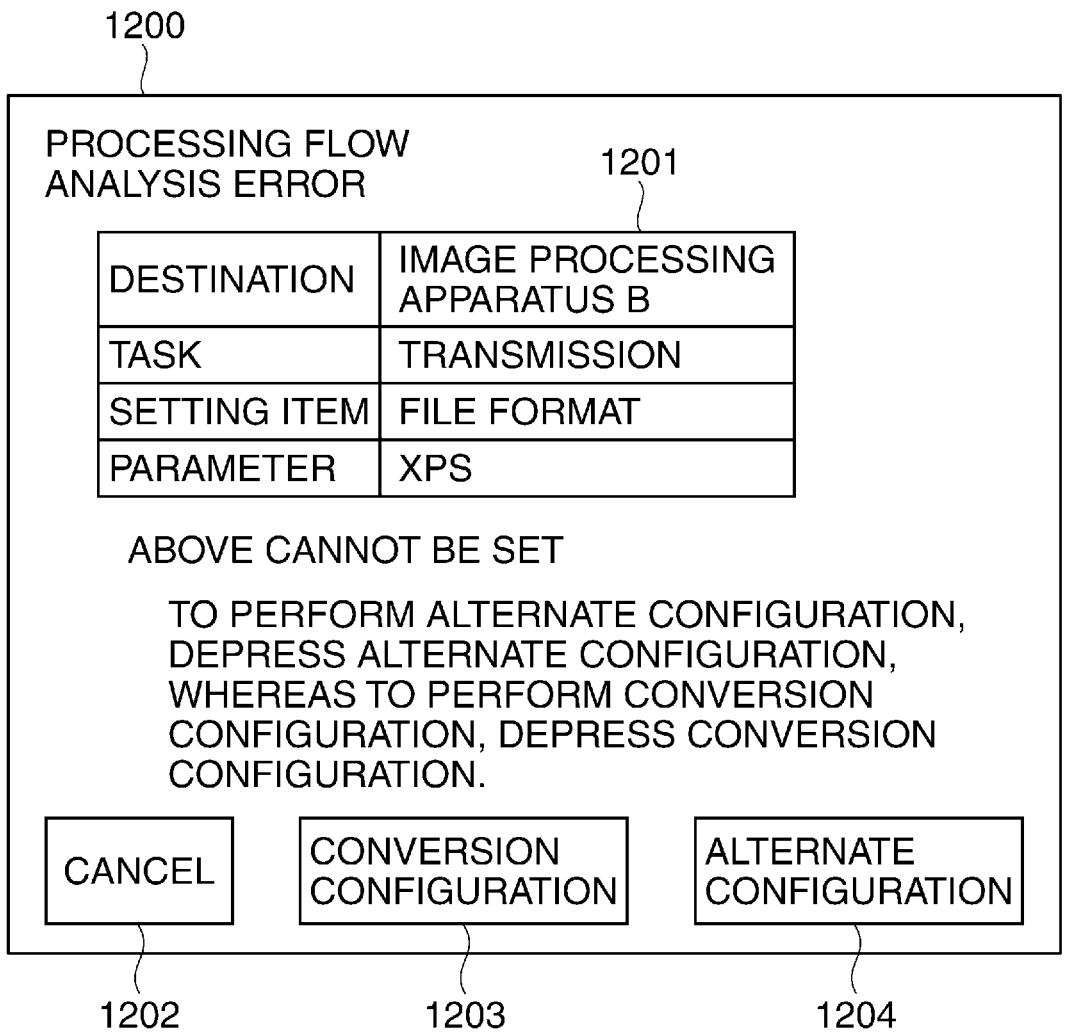
FIG. 12 is a diagram showing an example of an operation screen for causing a user to select between the processing flow conversion configuration and the processing flow alternate configuration.

In the step S1103, the CPU 201 causes an operation screen 1200 shown in FIG. 12 to be displayed on the operating section 111 to prompt the user to select between the processing flow conversion configuration and the processing flow alternate configuration.

In FIG. 12, a display 1201 displays, assuming that the image processing apparatus 110 sets the file format to XPS as a setting of a transmission task and transmits the processing flow to the image processing apparatus 120, a message saying that the image processing apparatus 120 is incapable of executing XPS, and hence the task cannot be set.

To cope with this inconvenience, the processing flow setting unit 312 accepts depression of a cancel button 1202, whereby the CPU 201 cancels the transmission. Further, the processing flow setting unit 312 accepts depression of a conversion configuration button 1203, whereby the process proceeds to the step S1104, wherein the processing flow conversion process is executed by the processing flow conversion setting unit 313. On the other hand, the processing flow setting unit 312 accepts depression of an alternate configuration button 1204, whereby the process proceeds to a step S1106, wherein the alternate processing flow configuration process is executed by the processing flow alternate setting unit 314. As described above, the image processing apparatus 110 is capable of selectively operating to configure the alternate processing flow or generate the converted processing flow according to the user's instruction.

Figure 13:
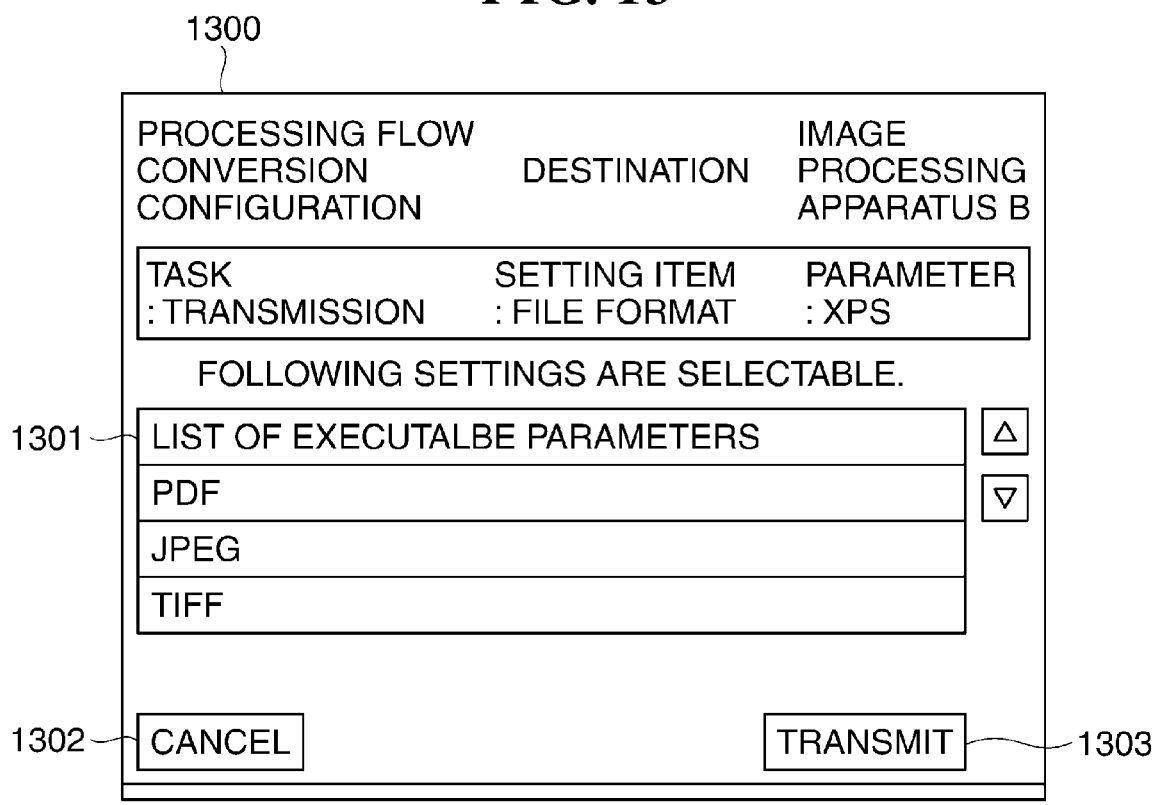
FIG. 13 is a diagram showing an example of an operation screen for selecting a parameter in the conversion configuration of the processing flow.

In the step S1104, the CPU 201 causes an operation screen 1300 shown in FIG. 13 to be displayed on the operating section 111. In FIG. 13, as mentioned hereinbefore, since the image processing apparatus 120 cannot process XPS, the operation screen 1300 displays a list 1301 of PDF, JPEG, and TIFF as values (executable parameters) which can be set by the image processing apparatus 120, for selection.

Then, the CPU 201 cancels the processing by accepting depression of a cancel button 1302, and the process proceeds to a step S1105 by accepting depression of a transmission button 1303.

In the step S1105, the CPU 201 causes the processing flow conversion setting unit 313 to replace the inexecutable parameter(s) in the processing flow by the parameter(s) selected in the step S1104, followed by terminating the present process.

FIG. 14 is a diagram showing a processing flow definition 1400 after the parameter replacement is performed in the step S1105.

In FIG. 14, exflag=1 in a tagged element denoted by a reference numeral 1401 indicates that the conversion configuration has been performed on contents (a parameter) of the tagged element. In this case, exflag=1 indicates that PDF denoted by a reference numeral 1402 is a converted value.

Figure 15:
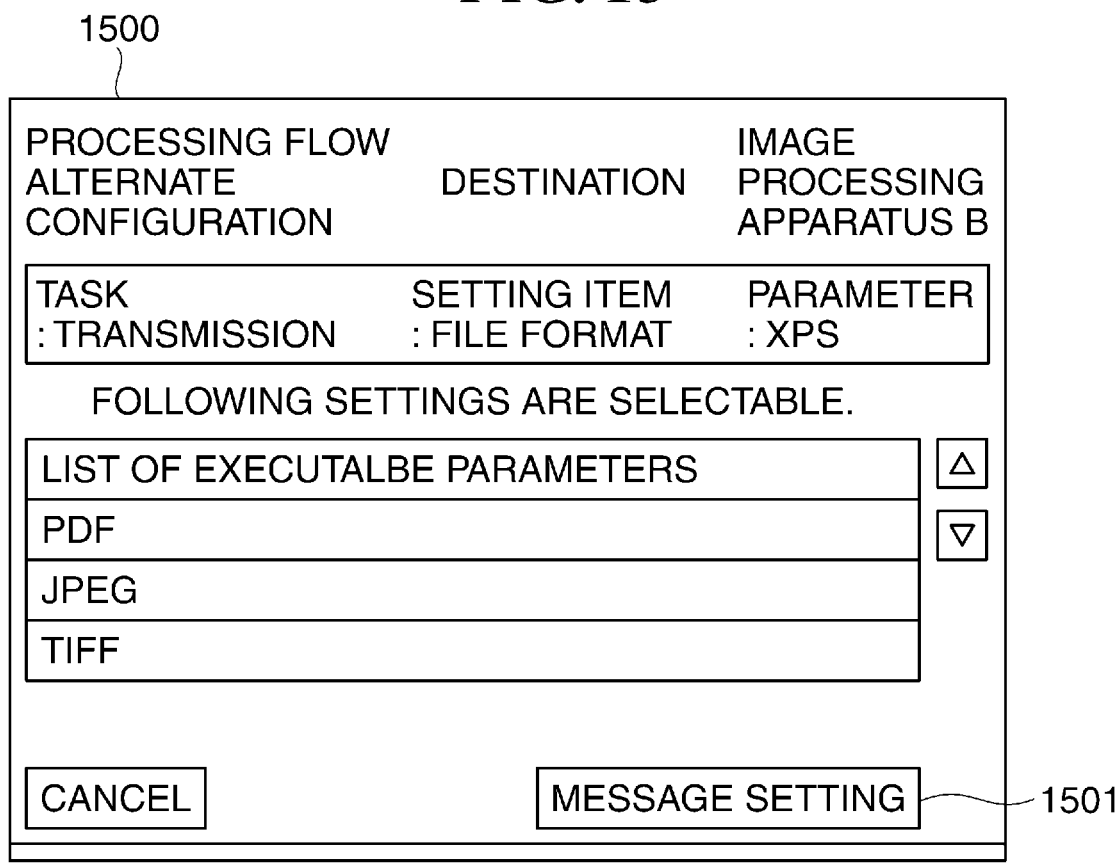
FIG. 15 is a diagram showing an example of an operation screen for selecting an alternate parameter in the processing flow alternate configuration.

On the other hand, in the step S1106, the CPU 201 causes an operation screen 1500 shown in FIG. 15 to be displayed on the operating section 111.

This operation screen 1500 displays a list of values that can be set as an alternate setting. User's selection on the list screen causes the process to proceed to a step S1107, wherein the CPU 201 causes the processing flow alternate setting unit 314 to define the alternate setting, as a setting which is to be referred to as an alternate in case of failure of execution of the processing flow by the image processing apparatus 120, and then the process proceeds to a step S1108.

In the step S1108, if a message-setting button 1501 in FIG. 15 is depressed, the process proceeds to a step S1109, whereas if not, the CPU 201 immediately terminates the present process.

Figure 16:
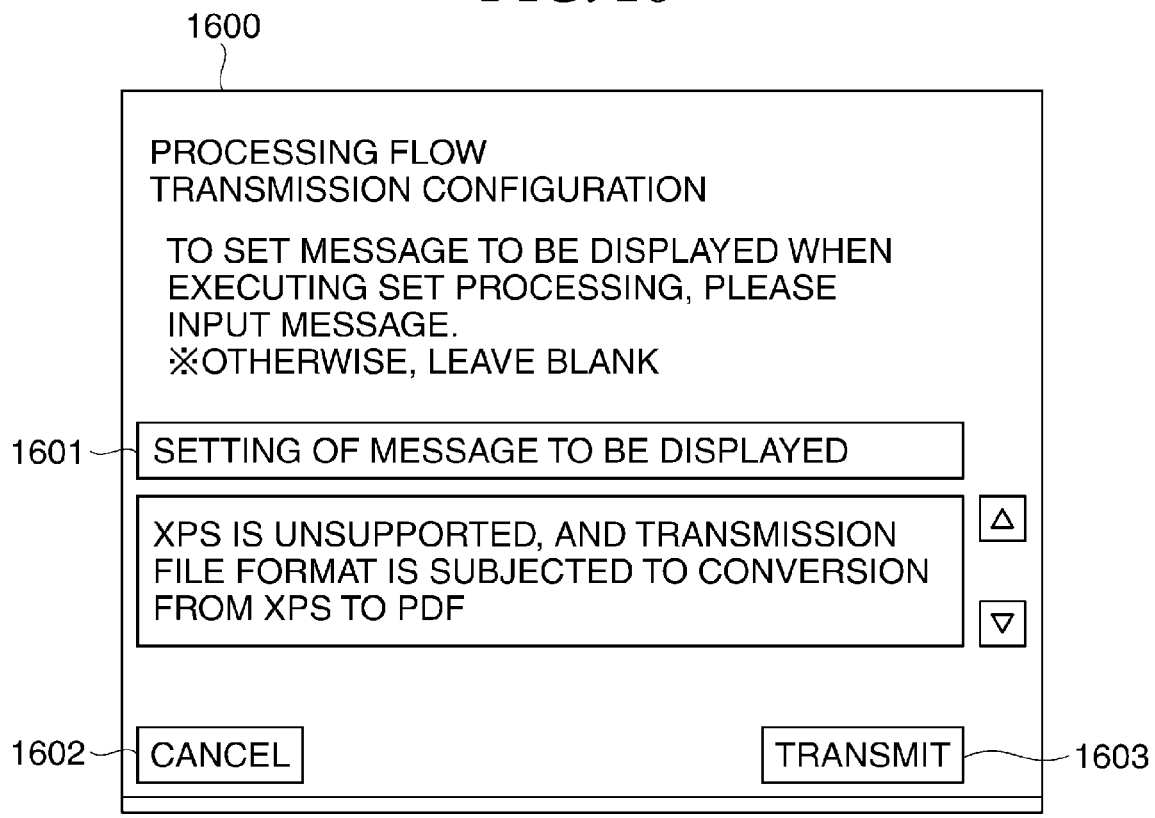
FIG. 16 is a diagram showing an example of a message setting screen displayed during the processing flow alternate configuration.

In the step S1109, the CPU 201 switches the operation screen 1500 shown in FIG. 15 to a message-setting screen 1600 shown in FIG. 16.

FIG. 16 shows the message-setting screen 1600 displayed during execution of the processing flow alternate configuration process, and by setting a desired output message on a display box 1601, it is possible to output the set message when the execution of the processing flow is unsuccessful.

Then, the CPU 201 cancels the processing by accepting depression of a cancel button 1602, and performs the setting of massage output in the processing flow by accepting depression of a transmission button 1603.

FIG. 17 is a diagram showing a processing flow definition 1700 during the processing flow alternate configuration.

In FIG. 17, exflag=2 in a tagged element denoted by a reference numeral 1701 indicates that the alternate configuration has been performed on contents (a parameter) of the tagged element. Further, a line denoted by a reference numeral 1702 shows that PDF is set in place of XPS, a line denoted by a reference numeral 1703 shows that message output is set.

Further, also in the steps S1110 and S1111, similarly to the steps S1108 and S1109, if the setting of message output is selected, the CPU 201 can set the message output in the processing flow.

Now, let us consider, for example, a case where the image processing apparatus 110 transmits a processing flow configured to perform printing using FAX to the image processing apparatus 120.

Since the image processing apparatus 120 does not have a FAX function, it cannot even interpret the meaning itself of a setting on FAX in the transmitted processing flow definition, and hence it is understood that the image processing apparatus 120 cannot analyze this parameter when recording inexecutable parameters in the analysis result list in the step S806 in FIG. 8.

However, the parameter list 904 of parameters which can be set, which is required in performing the processing flow alternate configuration, is recorded as an empty list, and hence it is judged that it is impossible to replace the inexecutable parameter by an executable parameter.

Figure 18:
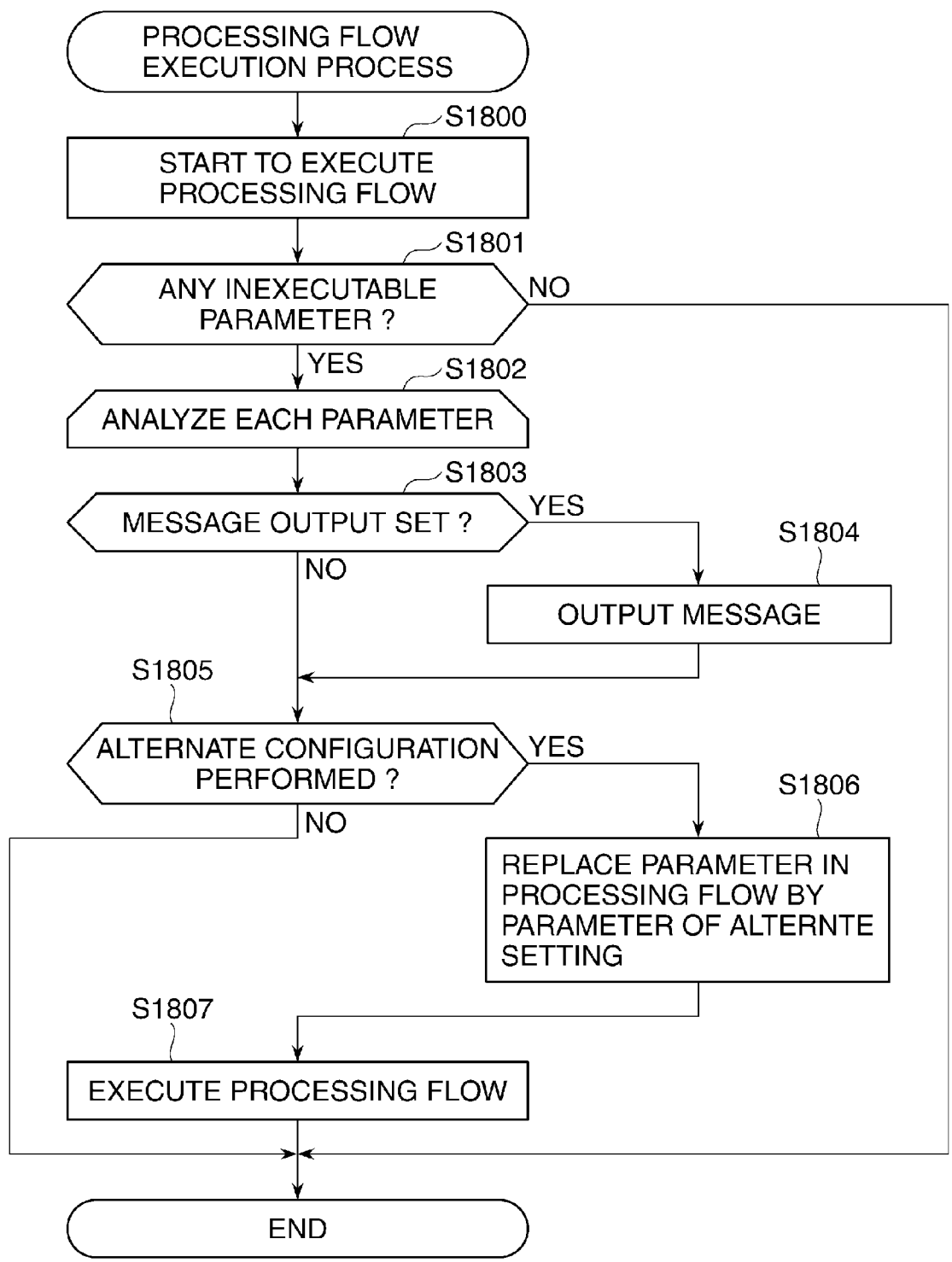
FIG. 18 is a flowchart of a processing flow execution process executed by the destination image processing apparatus.

FIG. 18 is a flowchart useful in explaining a processing flow execution process executed by the image processing apparatus 120. It should be noted that the processing flow execution process in FIG. 18 corresponds to "(6) EXECUTE PROCESSING FLOW" in FIG. 4, and is executed by the CPU 201A by loading a program stored in the ROM 202, the HDD 204 or the like of the image processing apparatus 120 into the RAM 203.

In a step S1800, the CPU 201A starts to execute the processing flow received from the image processing apparatus 110 using the processing flow execution unit 307.

Next, in a step S1801, the CPU 201A determines whether or not there is any parameter that cannot be executed by the processing flow execution unit 307 in the received processing flow.

Then, if there is no parameter that cannot be executed, the process proceeds to a step S1807, wherein the CPU 201A executes the received processing flow, followed by terminating the present process, whereas if there is any parameter that cannot be executed, the process proceeds to a step S1802. It should be noted that if the user selects the processing flow conversion configuration in the step S1103 in FIG. 11, it is determined in the step S1801 that there is no parameter that cannot be executed.

In the step S1802, the CPU 201A starts to analyze each of the parameters in the received processing flow, and the process proceeds to a step S1803.

In the step S1803, the CPU 201A determines whether or not the message output is set in the processing flow definition, and if the message output is set, the process proceeds to a step S1804, whereas if the message output is not set, the process proceeds to a step S1805.

In the step S1804, the CPU 201A causes the processing flow-displaying unit 305 to display the message on the display section 301, and the process proceeds to the step S1805.

In the step S1805, the CPU 201A determines whether or not the processing flow alternate configuration has been performed, i.e. whether or not alternate settings to be referred to are added, and if the processing flow alternate configuration has been performed, the process proceeds to a step S1806, whereas if the processing flow alternate configuration has not been performed, the CPU 201A terminates the present process without executing the processing flow.

In the step S1806, the CPU 201A replaces the unexecutable parameters in the processing flow by parameters as the alternate settings, and then the process proceeds to the step S1807, wherein the CPU 201A executes the processing flow, followed by terminating the present process.

As described above, in the present embodiment, it is possible to configure an alternate processing flow in advance by the source image processing apparatus 110 in case of failure of execution of the original processing flow by the destination image processing apparatus 120. The processing flow alternate configuration is not intended to mean converting the processing flow itself, but to mean adding, to the processing flow, settings to be referred to in case of failure of the processing flow by the image processing apparatus 120. Therefore, if the destination (receiving side) image processing apparatus 120 becomes compatible with the processing to be originally realized by the processing flow thanks to version upgrade of an application or controller firmware, not the alternative settings but the original settings can be referred to.

To explain with reference to FIG. 18, let it be assumed that the processing flow contains a setting or parameter that cannot be executed, and hence it is determined in the step S1801 that there is a parameter that cannot be executed, whereby the alternate setting is executed. Even in such a case, if the application or the image processing apparatus 120 has its version upgraded, it can be determined in the step S1801 that there is no parameter that cannot be executed. This makes it possible to execute the processing flow by the destination image processing apparatus 120 without the processing flow again from the source image processing apparatus 110 to the destination image processing apparatus 120.

It should be noted that if the image processing apparatus 120 has no plan to upgrade the version of the application or controller firmware, not by configuring the alternate processing flow but by converting the processing flow, it is possible to transmit the converted processing flow from the image processing apparatus 110 to the image processing apparatus 120 without adding an extra processing definition.

Further, if it is clear that even if the processing flow alternate configuration is performed, the alternate setting(s) is/are not referred to by the image processing apparatus 120, by preventing the processing flow alternate configuration from being selected, addition of an extra processing definition can be avoided.

Next, a description will be given of an image processing system according to a second embodiment of the present invention with reference to FIGS. 19 and 20. It should be noted that duplicate or corresponding portions of the above-described first embodiment will be described using the figures and the reference numerals of the first embodiment.

In the above-described first embodiment, it is analyzed whether or not the processing flow can be executed by the destination image processing apparatus 120 which receives the processing flow, and the analysis result is transmitted to the source image processing apparatus 110. Then, the alternate configuration is performed on the processing flow including inexecutable setting(s) based on the analysis result in advance by the source image processing apparatus 110, which prevents the destination image processing apparatus 120 from failing in execution of the processing flow.

Differently from the first embodiment, in the present embodiment, whether or not the processing flow can be executed is determined not by the destination image processing apparatus 120 but by the source image processing apparatus 110, which inquires of the device management server 102 managing the processing capability of the destination image processing apparatus 120.

Figure 19:
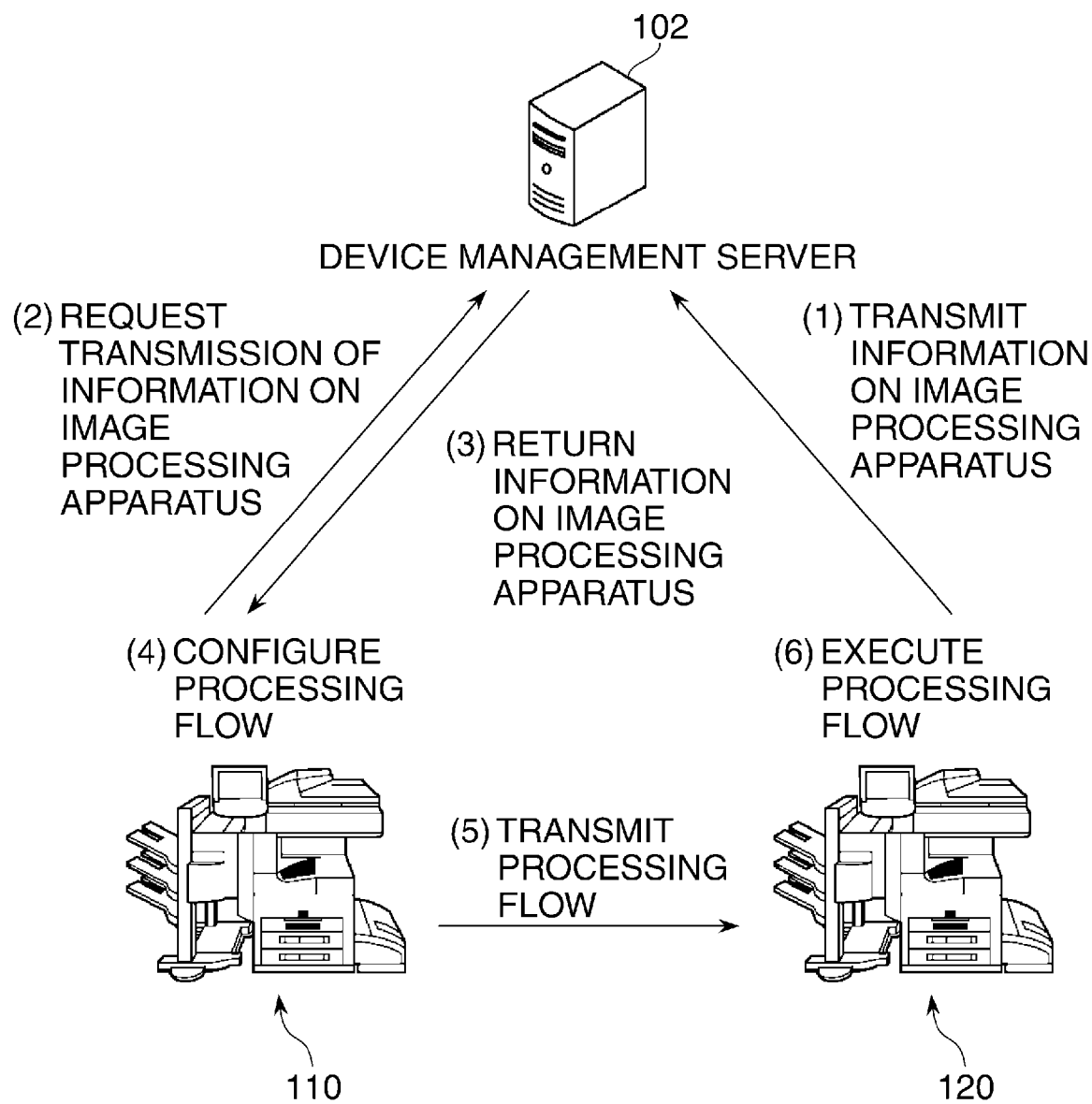
FIG. 19 is a diagram useful in explaining the configuration of an image processing system according to a second embodiment of the present invention.

FIG. 19 is a diagram useful in explaining the configuration of the image processing system according to the second embodiment of the present invention.

In FIG. 19, the device management server 102 manages information on a plurality of models of image processing apparatuses. The image processing apparatus 120 transmits the device information to the device management server 102, whereby the device management server 102 manages the processing capability of the image processing apparatus 120. This processing corresponds to "(1) TRANSMIT INFORMATION ON IMAGE PROCESSING APPARATUS" in FIG. 19.

The image processing apparatus 110 transmits a request for transmitting the device information of the image processing apparatus 120, to the device management server 102 so as to acquire the processing capability of the image processing apparatus 120 before transmitting the processing flow to the image processing apparatus 120. This processing corresponds to "(2) REQUEST TRANSMISSION OF INFORMATION ON IMAGE PROCESSING APPARATUS" in FIG. 19.

The device management server 102 returns the device information of the image processing apparatus 120 to the image processing apparatus 110 as a response to the transmission request from the image processing apparatus 110. This processing corresponds to "(3) RETURN INFORMATION ON IMAGE PROCESSING APPARATUS" in FIG. 19.

Then, the image processing apparatus 110 which acquired the device information of the image processing apparatus 120 executes the processing flow configuration process based on the acquired device information. This processing corresponds to "(4) CONFIGURE PROCESSING FLOW" in FIG. 19.

Figure 20:
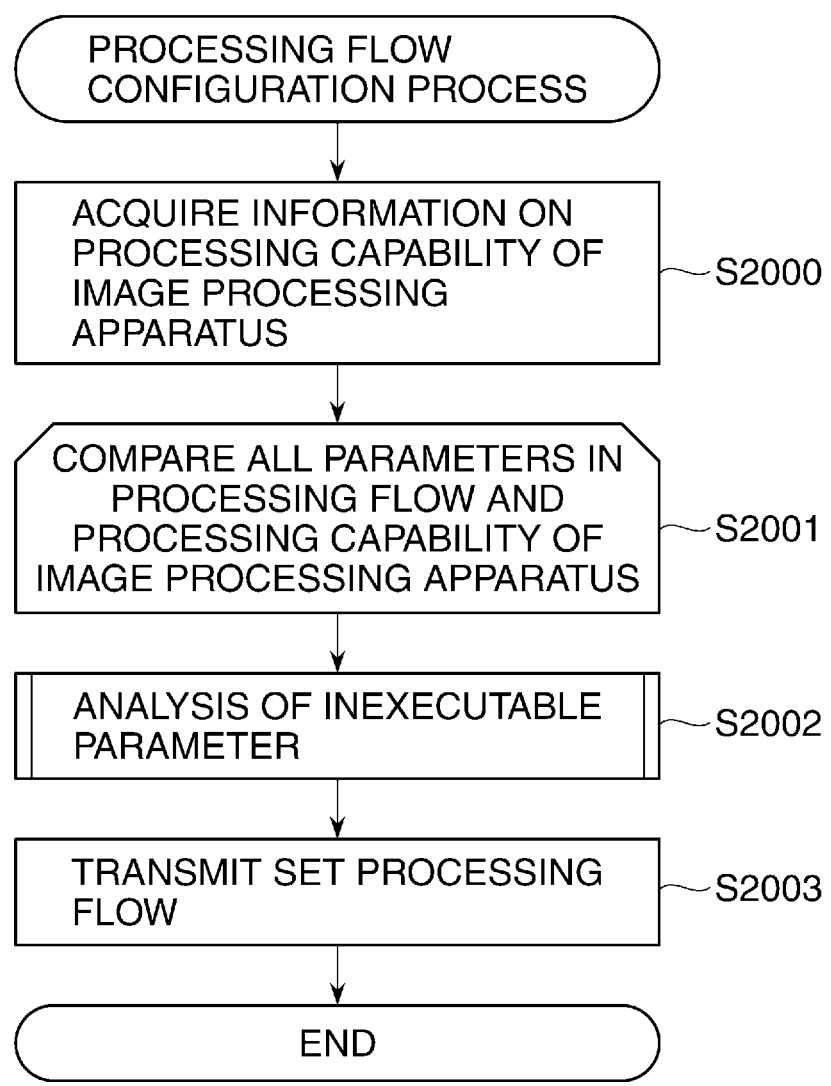
FIG. 20 is a flowchart of a processing flow configuration process executed by the source image processing apparatus.

FIG. 20 is a flowchart useful in explaining the processing flow configuration process executed by the image processing apparatus 110. The steps in FIG. 20 are executed by the CPU 201 by loading an associated program stored in the ROM 202, the HDD 204 or the like of the image processing apparatus 110 into the RAM 203.

In a step S2000, the CPU 201 acquires the device information (processing capability information) of the image processing apparatus 120 from the device management server 102, and the process proceeds to a step S2001.

In the step S2001, the CPU 201 compares all of the parameters in the processing flow to be transmitted and the processing capability information of the image processing apparatus 120, and the process proceeds to a step S2002.

In the step S2002, the CPU 201 executes the parameter-analyzing process on any parameter that is determined to be inexecutable by the image processing apparatus 120 as a result of comparison in the step S2001, to thereby configure the processing flow, and the process proceeds to a step S2003. It should be noted that the process for analyzing the inexecutable parameter is the same as the analysis processing (FIGS. 11 to 17) in the above-described first embodiment.

In the step S2003, the CPU 201 transmits the processing flow configured in the step S2002 to the image processing apparatus 120 (corresponds to "(5) TRANSMIT PROCESSING FLOW" in FIG. 19).

It should be noted that "(6) EXECUTE PROCESSING FLOW" in FIG. 19 in the image processing apparatus 120 is the same as that in the above-described first embodiment (FIG. 18).

It should be noted that in the present embodiment, a personal computer may serve as the image processing apparatus 110 which is on a source side from which the processing flow is transmitted. In the present embodiment, the image processing apparatus, the personal computer or the like is generically referred to as an information processing apparatus.

As described above, in the present embodiment, since the device information of each of a plurality of image processing apparatuses is managed by the device management server 102, it is possible to deliver the processing flow to the plurality of image processing apparatuses at the same time.

Further, the source image processing apparatus 110 acquires the device information of each of the plurality of image processing apparatuses from the device management server 102, which makes unnecessary to inquire of each of the image processing apparatuses as to whether or not it is possible to execute the processing flow. The other configuration and the advantageous effects are the same as those of the above-described first embodiment.

It should be noted that the present invention is not limited to the above-described embodiments, but it can be practiced in various forms, without departing from the spirit and scope thereof.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-294426, filed Nov. 18, 2008, which is hereby incorporated by reference herein in its entirety.

What is claimed is:

1. An image processing system including an information processing apparatus that transmits a processing flow defining a series of processes to be executed using a plurality of functions, and an image processing apparatus that receives and executes the processing flow transmitted from the information processing apparatus, wherein the information processing apparatus comprises:
   an acquisition unit adapted to acquire device information of the image processing apparatus;
   an identification unit adapted to identify a first setting which cannot be executed by the image processing apparatus, out of settings contained in a first series of processes of the processing flow, based on the device information of the image processing apparatus acquired by said acquisition unit;
   a determination unit adapted to determine an alternate setting which can be executed by the image processing apparatus, for the first setting identified by said identification unit;
   an alternate processing flow configuration unit adapted to configure an alternate processing flow which includes both of the first setting and the alternate setting, wherein the alternate processing flow enables the image processing apparatus to selectively execute either of the first setting and the alternate setting and
   a transmission unit adapted to transmit the alternate processing flow, including both of the first setting and the alternate setting, to the image processing apparatus,
   wherein the image processing apparatus executes the alternate setting included in the alternate processing flow if the image processing apparatus cannot execute the first setting, and
   wherein the image processing apparatus executes the first setting included in the alternate processing flow if the image processing apparatus can execute the first setting.

2. An information processing apparatus that stores a processing flow defining a first series of processes, the information processing apparatus comprising:
   an identification unit adapted to identify a first setting which cannot be executed by an image processing apparatus as a destination to which the processing flow is to be transmitted, out of settings contained in the first series of processes defined by the processing flow, based on device information of the image processing apparatus;
   a determination unit adapted to determine an alternate setting which can be set executed by the image processing apparatus, for the first setting identified by said identification unit;
   an alternate processing flow configuration unit adapted to configure an alternate processing flow which includes both of the first setting and the alternate setting, wherein the alternate processing flow enables the image processing apparatus to do selective execution of either of the first setting and the alternate setting; and
   a transmission unit adapted to transmit the alternate processing flow, including both of the first setting and the alternate setting, to the image processing apparatus,
   wherein the image processing apparatus executes the alternate setting included in the alternate processing flow if the image processing apparatus cannot execute the first setting, and wherein the image processing apparatus executes the first setting included in the alternate processing flow if the image processing apparatus can execute the first setting.

3. The information processing apparatus according to claim 2, further comprising:
a converted processing flow creation unit adapted to create a converted processing flow by converting the first setting identified by said identification unit, which is contained in the processing flow, to a second setting which can be executed by the image processing apparatus; and
a selection unit adapted to select whether to cause said converted processing flow creation unit to create the converted processing flow, or to cause said alternate processing flow configuration unit to configure the alternate processing flow, based on an instruction from a user.

4. The information processing apparatus according to claim 2, wherein the device information is received from the image processing apparatus as an the analysis result obtained by analyzing the processing flow.

5. The information processing apparatus according to claim 2, wherein the device information is information received from a management server that manages the device information of the image processing apparatus.

6. The information processing apparatus according to claim 2, wherein said alternate processing flow configuration unit is capable of setting a message to be output by the image processing apparatus, in the alternate processing flow.

7. A method of controlling an information processing apparatus that stores a processing flow defining a first series of processes, the method comprising:
identifying a first setting which cannot be executed by an image processing apparatus as a destination to which the processing flow is to be transmitted, out of settings contained in the first series of processes defined by the processing flow, based on device information of the image processing apparatus;
determining an alternate setting which can be executed by the image processing apparatus, for the first setting identified by said identifying;
configuring an alternate processing flow, which includes both of the first setting and the alternate setting, wherein the alternate processing flow enables the image processing apparatus to do selective execution of either of the first setting and the alternate setting; and
transmitting the alternate processing flow, including both of the first setting and the alternate setting, to the image processing apparatus,
wherein the image processing apparatus executes the alternate setting included in the alternate processing flow if the image processing apparatus cannot execute the first setting, and
wherein the image processing apparatus executes the first setting included in the alternate processing flow if the image processing apparatus can execute the first setting.

8. A non-transitory computer-readable storage medium storing a program for causing a computer to execute a method of controlling an information processing apparatus that stores a processing flow defining a first series of processes, wherein the method comprises:
identifying a first setting which cannot be executed by an image processing apparatus as a destination to which the processing flow is to be transmitted, out of settings contained in the first series of processes defined by the processing flow, based on device information of the image processing apparatus;
determining an alternate setting which can be executed by the image processing apparatus, for the first setting identified by said identifying;
configuring an alternate processing flow, which includes both of the first setting and the alternate setting, wherein the alternate processing flow enables the image processing apparatus to do selective execution of either of the first setting and the alternate setting; and
transmitting the alternate processing flow, including both of the first setting and the alternate setting, to the image processing apparatus,
wherein the image processing apparatus executes the alternate setting included in the alternate processing flow if the image processing apparatus cannot execute the first setting, and
wherein the image processing apparatus executes the first setting included in the alternate processing flow if the image processing apparatus can execute the first setting.

* * * * *